(12) United States Patent
Dunn et al.

(10) Patent No.: US 12,002,983 B1
(45) Date of Patent: Jun. 4, 2024

(54) INTEGRATED ELECTRICAL PROBE AND BREATHER PORT

(71) Applicant: Rivian IP Holdings, LLC, Plymouth, MI (US)

(72) Inventors: Casey Taylor Dunn, Mission Viejo, CA (US); Daniel Alfredo Hernandez Saab, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/191,803

(22) Filed: Mar. 28, 2023

Related U.S. Application Data

(60) Provisional application No. 63/436,390, filed on Dec. 30, 2022.

(51) Int. Cl.
*H01M 50/325* (2021.01)
*H01M 50/209* (2021.01)
*B60L 50/64* (2019.01)

(52) U.S. Cl.
CPC ....... *H01M 50/325* (2021.01); *H01M 50/209* (2021.01); *B60L 50/64* (2019.02); *H01M 2220/10* (2013.01); *H01M 2220/20* (2013.01)

(58) Field of Classification Search
CPC ............ H01M 50/317; H01M 50/325; H01M 50/569; H05K 5/0213; H05K 5/0214; H05K 5/0215; H05K 5/0216; B60L 53/16; G01R 31/364
See application file for complete search history.

(56) References Cited

U.S. PATENT DOCUMENTS 10,264,693 B1   4/2019   Gilmore et al.

*Primary Examiner* — Maria Laios
*Assistant Examiner* — Jordan E Berresford
(74) *Attorney, Agent, or Firm* — BAKERHOSTETLER

(57) ABSTRACT

Aspects of the disclosure relate to a service port for an electrical power supply such as a battery. The service port may be an integrated pressure equalization and electrical probe port. In one or more implementations, the service port may include a housing have an open bore within which an electrical header is disposed. A gap may be provided between the electrical header and the housing to allow airflow though the service port into and/or out of an internal chamber of the electrical power supply for pressure equalization of the internal chamber. In one or more implementations, a breather element may be disposed in a distal end of the housing of the service port.

20 Claims, 14 Drawing Sheets

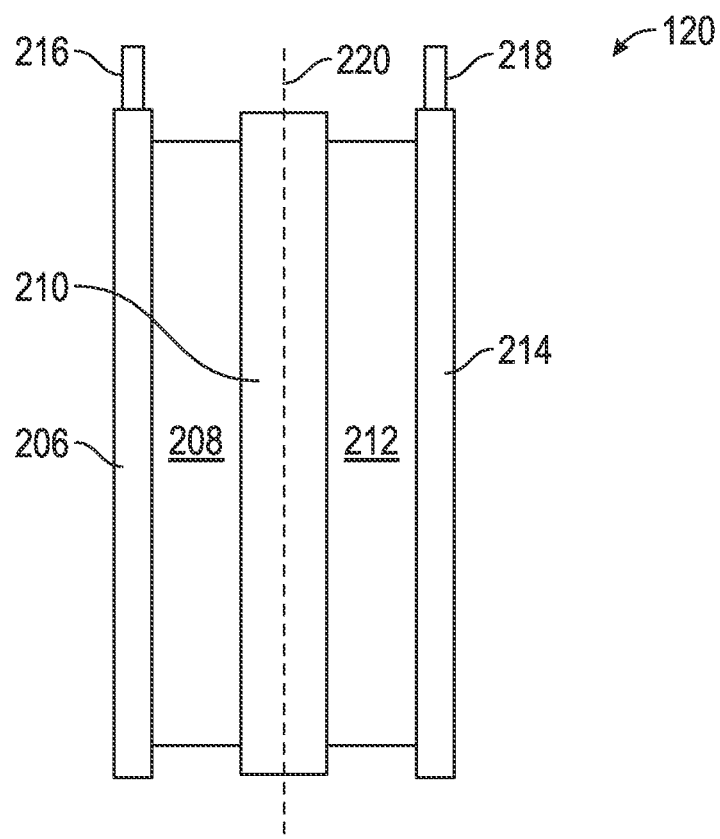
FIG. 2C
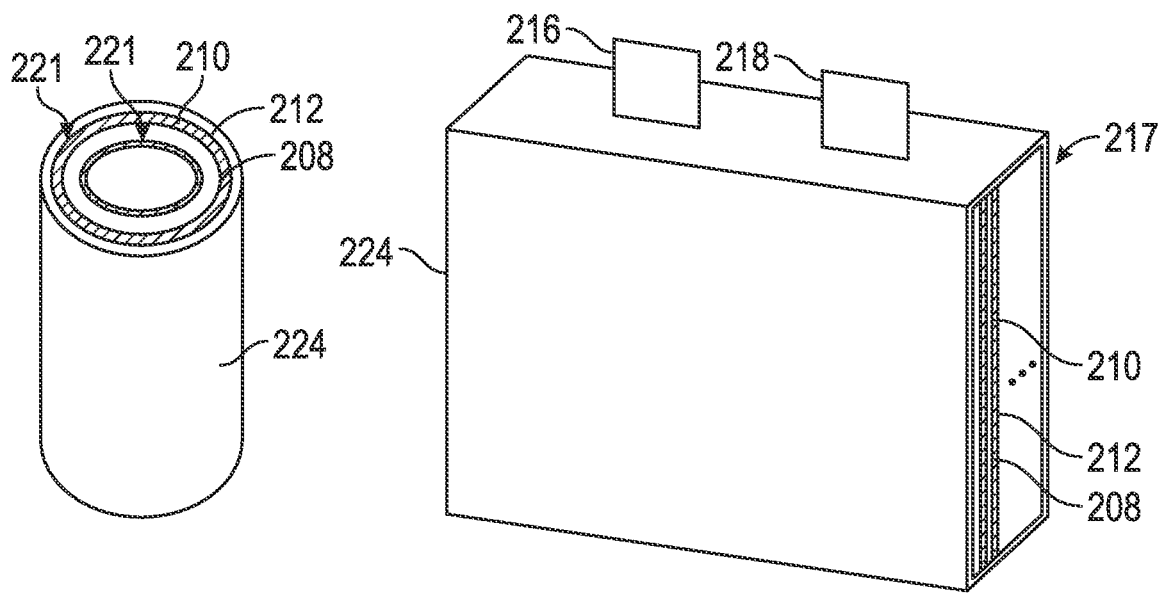
FIG. 2D
FIG. 2E

INTEGRATED ELECTRICAL PROBE AND BREATHER PORT

CROSS REFERENCE TO RELATED APPLICATIONS

This application claims the benefit of priority to U.S. Provisional Patent Application No. 63/436,390, entitled, "Integrated Electrical Probe and Breather Port", filed on Dec. 30, 2022, the disclosure of which is hereby incorporated herein in its entirety.

INTRODUCTION

Batteries are often used as a source of power, including as a source of power for electric vehicles that include wheels that are driven by an electric motor that receives power from the battery.

Aspects of the subject technology can help to improve the reliability and/or serviceability of electric vehicles, which can help to mitigate climate change by reducing greenhouse gas emissions.

SUMMARY

The present description relates generally to service ports for electrical power supplies, including, for example, integrated electrical probe and breather ports. For example, a single service port may function both as a pressure equalization port and a high voltage probe port. A service port such as an integrated electrical probe and breather port may be provided for a battery or any other electrical power supply, including high voltage power supplies. A service port such as an integrated electrical probe and breather port may be implemented as pressure equalization port that includes an electrical header within the pressure equalization port.

In accordance with one or more aspects of the disclosure, an apparatus is provided that includes a housing having a proximal end and a distal end. The housing may include a proximal opening, a distal opening at the distal end of the housing, and an open bore extending between the distal opening and the proximal opening. The apparatus may also include an electrical header that extends through the proximal opening into the open bore and includes a pair of electrical contacts disposed within the open bore. In one or more implementations, the apparatus may also include a breather element mounted in the distal opening.

In accordance with one or more aspects of the disclosure, an apparatus is provided that includes a housing comprising an open bore extending between a distal opening and a proximal opening of the housing; an electrical header that extends through the proximal opening into the open bore and includes one or more electrical contacts disposed within the open bore; and a breather element mounted in the distal opening.

The apparatus may also include a gap between a sidewall of the proximal opening and a portion of the electrical header that is disposed within the proximal opening. The gap may form an airflow pathway between the open bore and a volume outside the housing.

The gap, the open bore, and the breather element may form a pressure equalization port. The breather element may include a two-way pressure equalization membrane. In some examples, the breather element may be attached to the housing, at least in part, by a friction fit between a cylindrical portion of the breather element and a sidewall of the open bore, such that the friction fit forms a radial seal between the open bore and external environment. In other examples, the housing may include a threaded portion within the open bore extending from the distal end toward the proximal end, and the breather element may include a threaded portion that is mated to the threaded portion of the housing. The housing may include one or more retention fingers that hold the electrical header within the proximal opening.

In one or more implementations, the apparatus may also include a base at a proximal end of the housing and configured for attachment to a battery pack frame, and a gasket configured to seal an interface between the base of the housing and the battery pack frame. The electrical header may be electrically coupled to a high voltage harness within a battery pack frame. The apparatus may be attached to a battery pack frame. The battery pack frame may be disposed in an electric vehicle. The battery pack frame may be integrated into an energy storage system for a building.

In accordance with one or more aspects of the disclosure, a battery pack is provided that includes a pack frame having an interior chamber configured for storing one or more battery cells; a high voltage harness; and a pressure equalization port on the pack frame that includes an electrical header within the pressure equalization port and electrically coupled to the high voltage harness. The pressure equalization port may be configured to equalize an interior pressure within the interior chamber with an external pressure in an environment outside the pack frame.

In one or more implementations, the pressure equalization port may include a housing having a proximal end coupled to the pack frame, and a distal end. The housing may include a proximal opening, a distal opening at the distal end of the housing, and an open bore extending between the distal opening and the proximal opening.

In accordance with one or more aspects of the disclosure, a battery pack is provided that includes a pack frame having an interior chamber configured for storing one or more battery cells; a high voltage harness; and a pressure equalization port on the pack frame. The pressure equalization port may include a housing having an open bore extending between a distal opening and a proximal opening of the housing; an electrical header that is electrically coupled to the high voltage harness, that extends through the proximal opening into the open bore, and that includes one or more electrical contacts disposed within the open bore; and a breather element mounted in the distal opening.

The open bore may be fluidly coupled to the interior chamber within the pack frame. In one or more implementations, the battery pack may also include an opening in the pack frame that is aligned with the proximal opening. The electrical header may include a portion that extends through the opening in the pack frame and through the proximal opening into the open bore. The electrical header may be connected to a high voltage harness within the interior chamber via the opening in the pack frame.

In accordance with one or more aspects of the disclosure, a method of servicing an electrical power supply is provided, the method including removing a breather element from a distal opening of a service port housing that is attached to a frame of the electrical power supply, and inserting an electrical connecter through the distal opening into contact with an electrical header disposed within an open bore of the service port housing. The method of servicing the electrical power supply may also include determining, based on the contact between the electrical connecter and the electrical header, that one or more contactors within the electrical power supply are open; and disconnecting a device from the electrical power supply based on the determining.

In accordance with one or more aspects of the disclosure, a method is provided that includes attaching a housing of a service port to a battery pack frame; inserting an electrical header through an opening in the frame, through a proximal opening in the housing of the service port, and into an open bore in the housing of the service port; and attaching a breather valve to a distal opening in the housing of the service port.

In accordance with one or more aspects of the disclosure, an apparatus is provided that includes a housing that includes a distal opening and a proximal opening; an electrical header that extends through the proximal opening and includes one or more electrical contacts disposed within the housing; and a breather element mounted in the distal opening.

In accordance with one or more aspects of the disclosure, a battery pack is provided that includes: a pack frame having an interior chamber configured for storing one or more battery cells; a high voltage harness; and a pressure equalization port on the pack frame that includes: a housing having a distal opening and a proximal opening; an electrical header that is electrically coupled to the high voltage harness, that extends through the proximal opening, and that includes one or more electrical contacts disposed within the open bore; and a breather element mounted in the distal opening.

In accordance with one or more aspects of the disclosure, a method is provided that includes attaching a housing of a service port to a battery pack frame; inserting an electrical header through an opening in the frame, through a proximal opening in the housing of the service port, and into the housing of the service port; and attaching a breather valve to a distal opening in the housing of the service port.

BRIEF DESCRIPTION OF THE DRAWINGS

Certain features of the subject technology are set forth in the appended claims. However, for purpose of explanation, several embodiments of the subject technology are set forth in the following figures.

FIG. 2C illustrates a cross-sectional end view of a battery cell in accordance with one or more implementations.

FIG. 2D illustrates a cross-sectional perspective view of a cylindrical battery cell in accordance with one or more implementations.

FIG. 2E illustrates a cross-sectional perspective view of a prismatic battery cell in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Service technicians for electrical power supplies may use high voltage probe points to confirm contactors are open and/or high voltage connections are not live before disconnecting high voltage connections. Battery packs also often include separate pressure equalization membranes or breathers to avoid or mitigate pressure differentials between the pack exterior and interior that can damage components or have other adverse effects.

Aspects of the subject technology described herein relate to an integrated service port for an electrical power supply such as a battery pack. As described in further detail hereinafter, the integrated service port disclosed herein may function both as a pressure equalization port and a high voltage probe port. A service technician can use the disclosed integrated service port (also referred to herein as an integrated electrical probe and breather port) to probe to ensure that contactors within the battery pack are open before the technician disconnects any high voltage that is connected to a device that could be pulling current and potentially cause an arc upon disconnection.

Figure 1A:
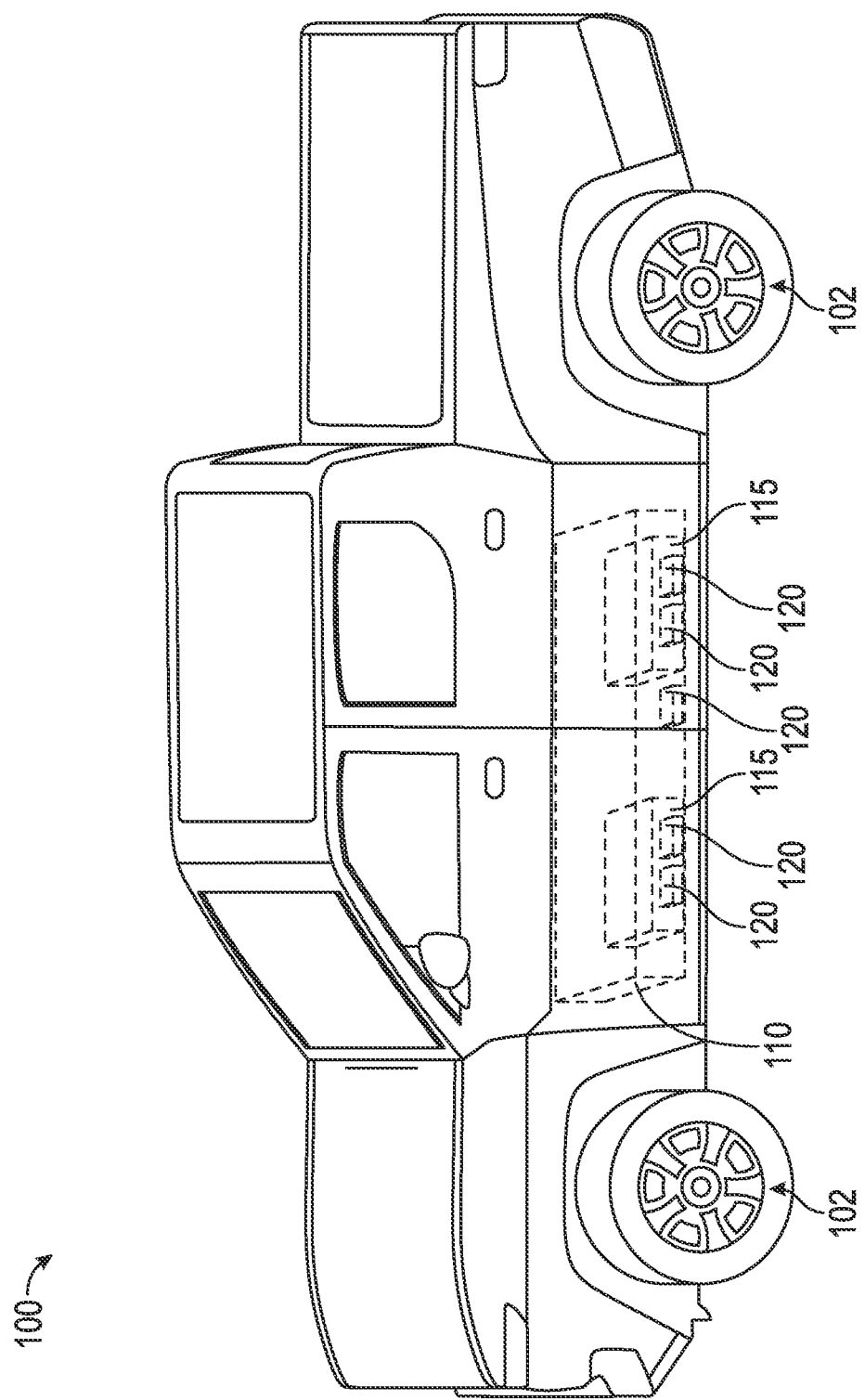
FIGS. 1A and 1B illustrate schematic perspective side views of example implementations of a vehicle having a battery pack in accordance with one or more implementations.

FIG. 1A is a diagram illustrating an example implementation of a moveable apparatus as described herein. In the example of FIG. 1A, a moveable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle using electric power from the battery pack 110. In one or more implementations, the vehicle 100 may also, or alternatively, include one or more chemically-powered engines, such as a gas-powered engine or a fuel cell powered motor. For example, electric vehicles can be fully electric or partially electric (e.g., hybrid or plug-in hybrid). In various implementations, the vehicle 100 may be a fully autonomous vehicle that can navigate roadways without a human operator or driver, a partially autonomous vehicle that can navigate some roadways without a human operator or driver or that can navigate roadways with the supervision of a human operator, may be an unmanned vehicle that can navigate roadways or other pathways without any human occupants, or may be a human operated (non-autonomous) vehicle configured for a human operator.

In the example of FIG. 1A, the vehicle 100 is implemented as a truck (e.g., a pickup truck) having a battery pack 110. As shown, the battery pack 110 may include one or more battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery unit or module can include an assembly of cells that can be combined with other elements (e.g., structural frame, thermal management devices) that can protect the assembly of cells from heat, shock and/or vibrations.

For example, the battery cell 120 can be included a battery, a battery unit, a battery module and/or a battery pack to power components of the vehicle 100. For example, a battery cell housing of the battery cell 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle). The power stage circuit can be provided as part of the battery pack 110 or separately from the battery pack 110 within the vehicle 100.

Figure 1B:
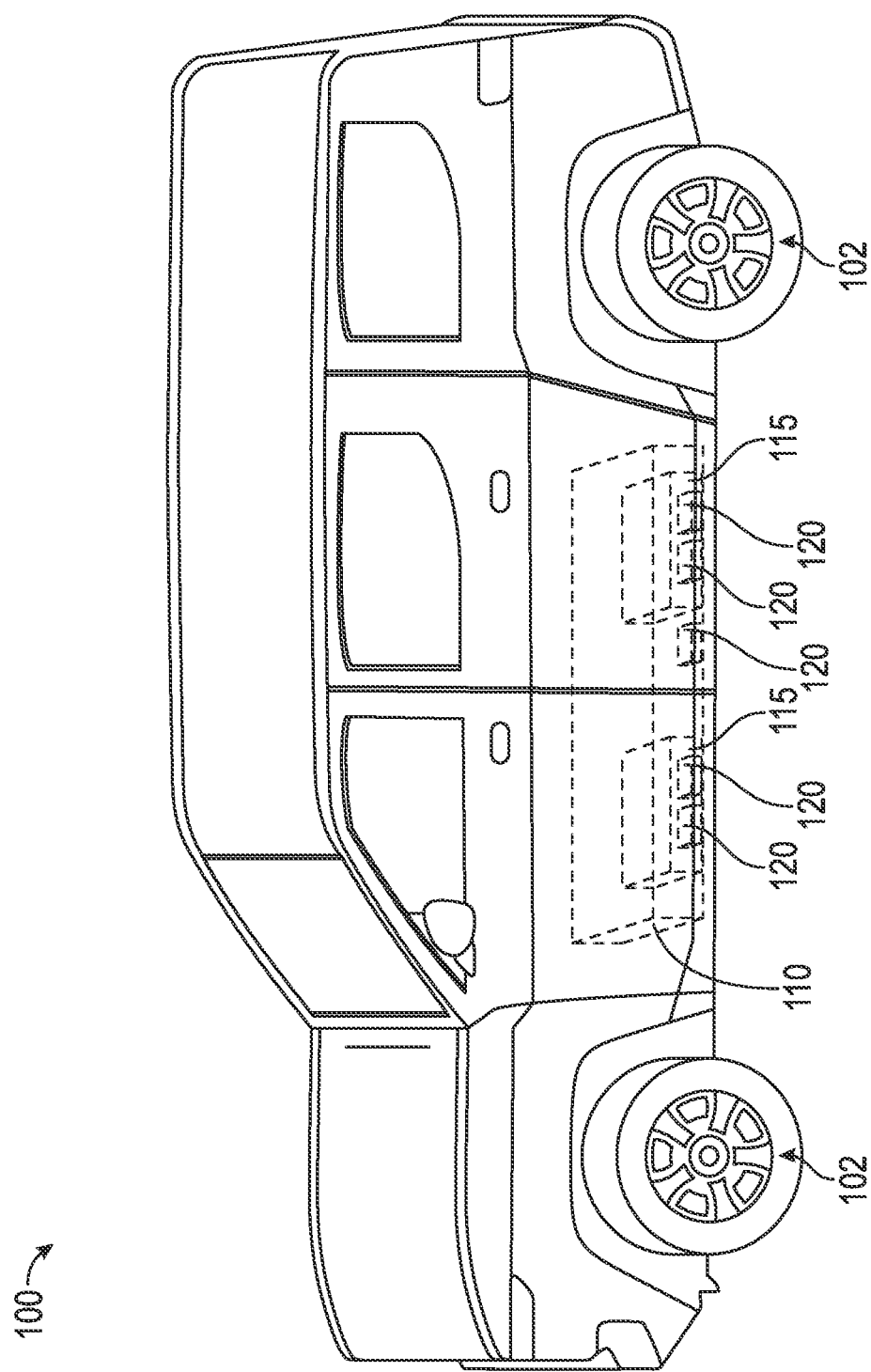

The example of FIG. 1A in which the vehicle 100 is implemented as a pickup truck having a truck bed at the rear portion thereof is merely illustrative. For example, FIG. 1B illustrates another implementation in which the vehicle 100 including the battery pack 110 is implemented as a sport utility vehicle (SUV), such as an electric sport utility vehicle. In the example of FIG. 1B, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 1C:
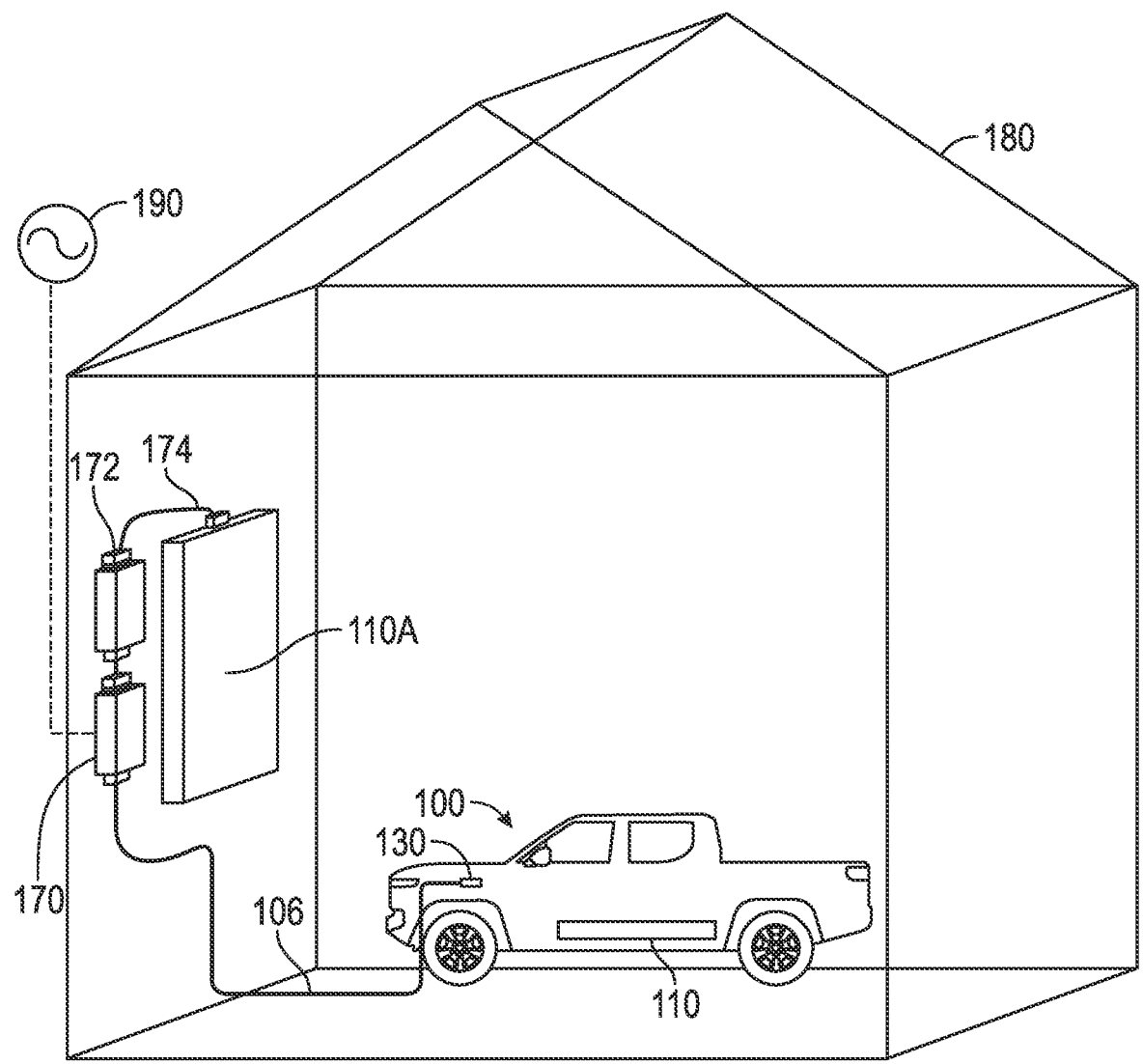
FIG. 1C illustrates a schematic perspective view of a building having a battery pack in accordance with one or more implementations.

In one or more implementations, a battery pack such as the battery pack 110, a battery module 115, a battery cell 120, and/or any other battery unit as described herein may also, or alternatively, be implemented as an electrical power supply and/or energy storage system in a building, such as a residential home or commercial building. For example, FIG. 1C illustrates an example in which a battery pack 110 is implemented in a building 180. For example, the building 180 may be a residential building, a commercial building, or any other building. As shown, in one or more implementations, a battery pack 110 may be mounted to a wall of the building 180.

As shown, the battery 110A that is installed in the building 180 may be couplable to the battery pack 110 in the vehicle 100, such as via: a cable/connector 106 that can be connected to the charging port 130 of the vehicle 100, electric vehicle supply equipment 170 (EVSE), a power stage circuit 172, and/or a cable/connector 174. For example, the cable/connector 106 may be coupled to the EVSE 170, which may be coupled to the battery 110A via the power stage circuit 172, and/or may be coupled to an external power source 190. In this way, either the external power source 190 or the battery 110A that is installed in the building 180 may be used as an external power source to charge the battery pack 110 in the vehicle 100 in some use cases. In some examples, the battery 110A that is installed in the building 180 may also, or alternatively, be coupled (e.g., via a cable/connector 174, the power stage circuit 172, and the EVSE 170) to the external power source 190. For example, the external power source 190 may be a solar power source, a wind power source, and/or an electrical grid of a city, town, or other geographic region (e.g., electrical grid that is powered by a remote power plant). During, for example, times when the battery pack 110 in the vehicle 100 is not coupled to the battery 110A that is installed in the building 180, the battery 110A that is installed in the building 180 can be coupled (e.g., using the power stage circuit 172 for the building 180) to the external power source 190 to charge up and store electrical energy. In some use cases, this stored electrical energy in the battery 110A that is installed in the building 180 can later be used to charge the battery pack 110 in the vehicle 100 (e.g., during times when solar power or wind power is not available, in the case of a regional or local power outage for the building 180, and/or during a period of high rates for access to the electrical grid).

In one or more implementations, the power stage circuit 172 may electrically couple the battery 110A that is installed in the building 180 to an electrical system of the building 180. For example, the power stage circuit 172 may convert DC power from the battery 110A into AC power for one or more loads in the building 180. For example, the battery 110A that is installed in the building 180 may be used to power one or more lights, lamps, appliances, fans, heaters, air conditioners, and/or any other electrical components or electrical loads in the building 180 (e.g., via one or more electrical outlets that are coupled to the battery 110A that is installed in the building 180). For example, the power stage circuit 172 may include control circuitry that is operable to switchably couple the battery 110A between the external power source 190 and one or more electrical outlets and/or other electrical loads in the electrical system of the building 180. In one or more implementations, the vehicle 100 may include a power stage circuit (not shown in FIG. 1C) that can be used to convert power received from the electric vehicle supply equipment 170 to DC power that is used to power/charge the battery pack 110 of the vehicle 100, and/or to convert DC power from the battery pack 110 into AC power for one or more electrical systems, components, and/or loads of the vehicle 100.

In one or more use cases, the battery 110A that is installed in the building 180 may be used as a source of electrical power for the building 180, such as during times when solar power or wind power is not available, in the case of a regional or local power outage for the building 180, and/or during a period of high rates for access to the electrical grid (as examples). In one or more other use cases, the battery pack 110 that is installed in the vehicle may be used to charge the battery 110A that is installed in the building 180 and/or to power the electrical system of the building 180 (e.g., in a use case in which the battery 110A that is installed in the building 180 is low on or out of stored energy and in which solar power or wind power is not available, a regional or local power outage occurs for the building 180, and/or a period of high rates for access to the electrical grid occurs (as examples)).

Figure 2A:
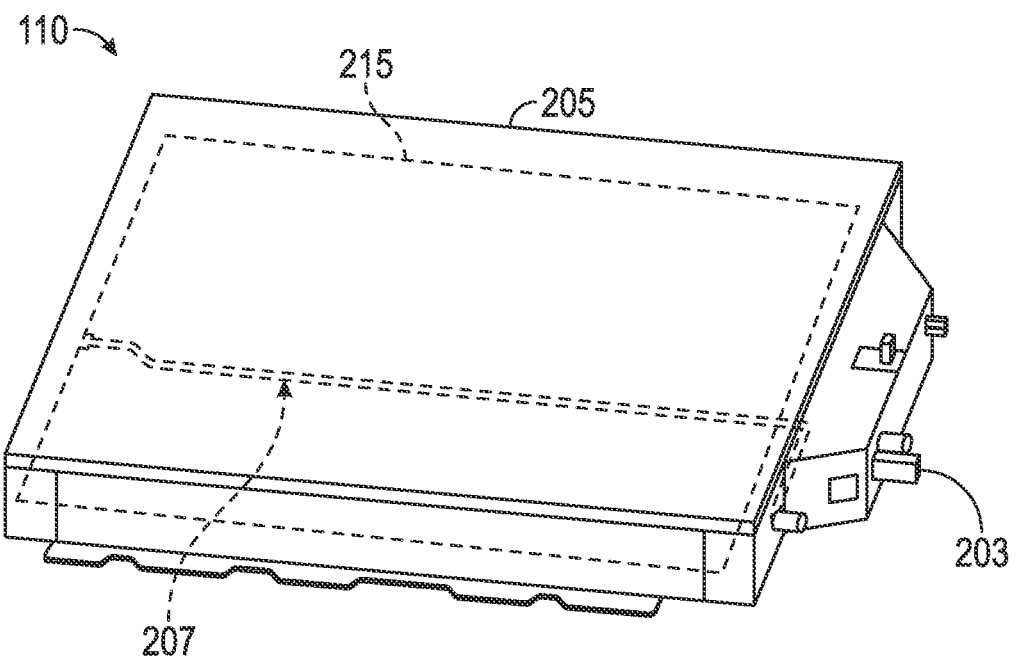
FIG. 2A illustrates a schematic perspective view of a battery pack in accordance with one or more implementations.

FIG. 2A depicts an example battery pack 110. Battery pack 110 may include multiple battery cells 120 (e.g., directly installed within the battery pack 110, or within batteries, battery units, and/or battery modules 115 as described herein) and/or battery modules 115, and one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within the battery pack frame 205 to generate a desired output voltage for the battery pack 110. The battery pack 110 may also include one or more external connection ports, such as an electrical contact 203 (e.g., a high voltage terminal). For example, an electrical cable (e.g., cable/connector 106) may be connected between the electrical contact 203 and an electrical system of the vehicle 100 or the building 180, to provide electrical power to the vehicle 100 or the building 180.

As shown, the battery pack 110 may include a battery pack frame 205 (e.g., a battery pack housing or pack frame). For example, the battery pack frame 205 may house or enclose one or more battery modules 115 and/or one or more battery cells 120, and/or other battery pack components. In one or more implementations, the battery pack frame 205 may include or form a shielding structure on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules 115, battery units, batteries, and/or battery cells 120 within the battery pack frame 205, such as by distributing fluid through the battery pack 110.

For example, the thermal control structures 207 may form a part of a thermal/temperature control or heat exchange system that includes one or more thermal components 215 such as plates or bladders that are disposed in thermal contact with one or more battery modules 115 and/or battery cells 120 disposed within the battery pack frame 205. For example, a thermal component 215 may be positioned in contact with one or more battery modules 115, battery units, batteries, and/or battery cells 120 within the battery pack frame 205. In one or more implementations, the battery pack 110 may include one or multiple thermal control structures 207 and/or other thermal components for each of several top and bottom battery module pairs. As shown, the battery pack 110 may include an electrical contact 203 (e.g., a high voltage connector) by which an external load (e.g., the vehicle 100 or an electrical system of the building 180) may be electrically coupled to the battery modules and/or battery cells in the battery pack 110.

Figure 2B:
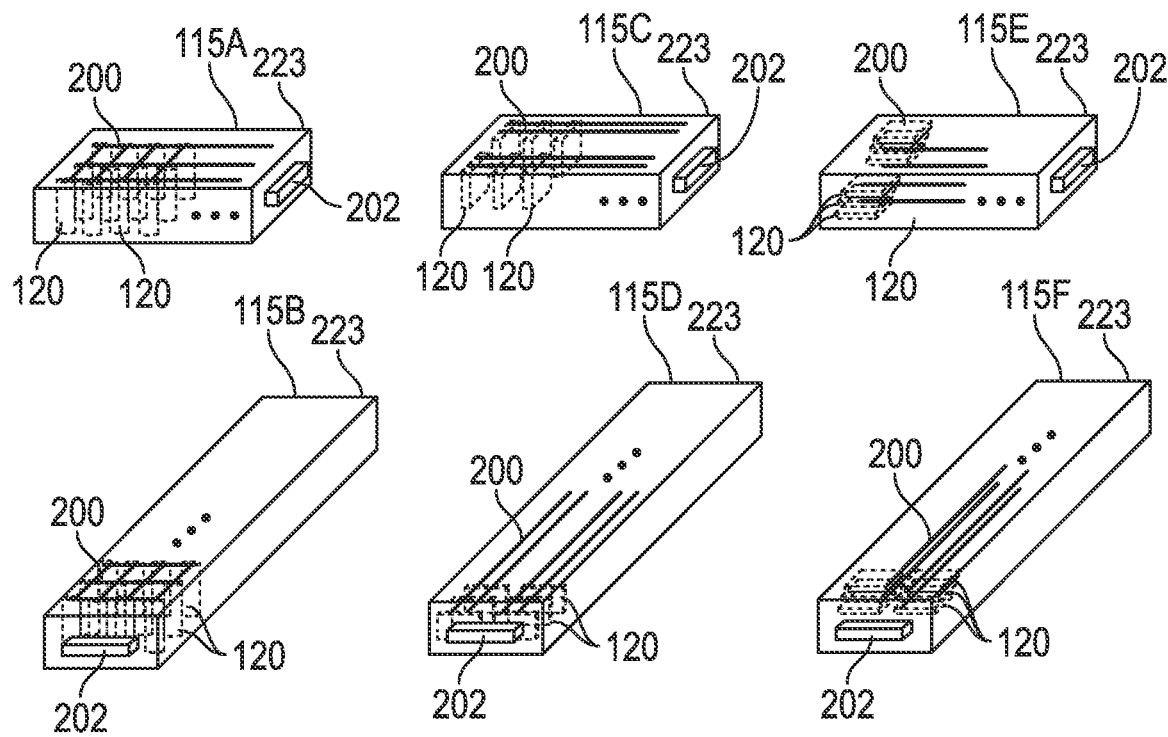
FIG. 2B illustrates schematic perspective views of various battery modules that may be included in a battery pack in accordance with one or more implementations.

FIG. 2B depicts various examples of battery modules 115 that may be disposed in the battery pack 110 (e.g., within the battery pack frame 205 of FIG. 2A). In the example of FIG. 2B, a battery module 115A is shown that includes a battery module housing 223 having a rectangular cuboid shape with a length that is substantially similar to its width. In this example, the battery module 115A includes multiple battery cells 120 implemented as cylindrical battery cells. In this example, the battery module 115A includes rows and columns of cylindrical battery cells that are coupled together by an interconnect structure 200 (e.g., a current connector assembly or CCA). For example, the interconnect structure 200 may couple together the positive terminals of the battery cells 120, and/or couple together the negative battery terminals of the battery cells 120. As shown, the battery module 115A may include a charge collector or bus bar 202. For example, the bus bar 202 may be electrically coupled to the interconnect structure 200 to collect the charge generated by the battery cells 120 to provide a high voltage output from the battery module 115A.

FIG. 2B also shows a battery module 115B having an elongate shape, in which the length of the battery module housing 223 (e.g., extending along a direction from a front end of the battery pack 110 to a rear end of the battery pack 110 when the battery module 115B is installed in the battery pack 110) is substantially greater than a width (e.g., in a transverse direction to the direction from the front end of the battery pack 110 to the rear end of the battery pack 110 when the battery module 115B is installed in the battery pack 110) of the battery module housing 223. For example, one or more battery modules 115B may span the entire front-to-back length of a battery pack within the battery pack frame 205. As shown, the battery module 115B may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115B.

In the implementations of battery module 115A and battery module 115B, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115C having a battery module housing 223 having a rectangular cuboid shape with a length that is substantially similar to its width and including multiple battery cells 120 implemented as prismatic battery cells. In this example, the battery module 115C includes rows and columns of prismatic battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115C may include a charge collector or bus bar 202. For example, the bus bar 202 may be electrically coupled to the interconnect structure 200 to collect the charge generated by the battery cells 120 to provide a high voltage output from the battery module 115C.

FIG. 2B also shows a battery module 115D including prismatic battery cells and having an elongate shape, in which the length of the battery module housing 223 (e.g., extending along a direction from a front end of the battery pack 110 to a rear end of the battery pack 110 when the battery module 115D is installed in the battery pack 110) is substantially greater than a width (e.g., in a transverse direction to the direction from the front end of the battery pack 110 to the rear end of the battery pack 110 when the battery module 115D is installed in the battery pack 110) of the battery module housing 223. For example, one or more battery modules 115D having prismatic battery cells may span the entire front-to-back length of a battery pack within the battery pack frame 205. As shown, the battery module 115D may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115D.

As another example, FIG. 2B also shows a battery module 115E having a battery module housing 223 having a rectangular cuboid shape with a length that is substantially similar to its width and including multiple battery cells 120 implemented as pouch battery cells. In this example, the battery module 115C includes rows and columns of pouch battery cells that are coupled together by an interconnect structure 200 (e.g., a current collector assembly or CCA). For example, the interconnect structure 200 may couple together the positive terminals of the battery cells 120 and couple together the negative battery terminals of the battery cells 120. As shown, the battery module 115E may include a charge collector or bus bar 202. For example, the bus bar 202 may be electrically coupled to the interconnect structure 200 to collect the charge generated by the battery cells 120 to provide a high voltage output from the battery module 115E.

FIG. 2B also shows a battery module 115F including pouch battery cells and having an elongate shape in which the length of the battery module housing 223 (e.g., extending along a direction from a front end of the battery pack 110 to a rear end of the battery pack 110 when the battery module 115E is installed in the battery pack 110) is substantially greater than a width (e.g., in a transverse direction to the direction from the front end of the battery pack 110 to the rear end of the battery pack 110 when the battery module 115E is installed in the battery pack 110) of the battery module housing 223. For example, one or more battery modules 115E having pouch battery cells may span the entire front-to-back length of a battery pack within the battery pack frame 205. As shown, the battery module 115E may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115E.

In various implementations, a battery pack 110 may be provided with one or more of any of the battery modules 115A, 115B, 115C, 115D, 115E, and 115F. In one or more other implementations, a battery pack 110 may be provided without battery modules 115 (e.g., in a cell-to-pack implementation).

In one or more implementations, multiple battery modules 115 in any of the implementations of FIG. 2B may be coupled (e.g., in series) to a current collector of the battery pack 110. In one or more implementations, the current collector may be coupled, via a high voltage harness, to one or more external connectors (e.g., electrical contact 203) on the battery pack 110. In one or more implementations, the battery pack 110 may be provided without any battery modules 115. For example, the battery pack 110 may have a cell-to-pack configuration in which battery cells 120 are arranged directly into the battery pack 110 without assembly into a battery module 115 (e.g., without including a separate battery module housing 223). For example, the battery pack 110 (e.g., the battery pack frame 205) may include or define a plurality of structures for positioning of the battery cells 120 directly within the battery pack frame 205.

FIG. 2C illustrates a cross-sectional end view of a portion of a battery cell 120. As shown in FIG. 2C, a battery cell 120 may include an anode 208, an electrolyte 210, and a cathode 212. As shown, the anode 208 may include or be electrically coupled to a first current collector 206 (e.g., a metal layer such as a layer of copper foil or other metal foil). As shown, the cathode 212 may include or be electrically coupled to a second current collector 214 (e.g., a metal layer such as a layer of aluminum foil or other metal foil). As shown, the battery cell 120 may include a first terminal 216 (e.g., a negative terminal) coupled to the anode 208 (e.g., via the first current collector 206) and a second terminal 218 (e.g., a positive terminal) coupled to the cathode (e.g., via the second current collector 214). In various implementations, the electrolyte 210 may be a liquid electrolyte layer or a solid electrolyte layer. In one or more implementations (e.g., implementations in which the electrolyte 210 is a liquid electrolyte layer), the battery cell 120 may include a separator layer 220 that separates the anode 208 from the cathode 212. In one or more implementations in which the electrolyte 210 is a solid electrolyte layer, the solid electrolyte layer may act as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium iron phosphate. As shown, the battery cell 120 may include a separator layer 220 that separates the anode 208 from the cathode 212. In an implementation in which the battery cell 120 is implemented as a lithium-ion battery cell, the electrolyte 210 may include a lithium salt in an organic solvent. The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cells 120 are implemented as lithium-ion battery cells, some or all of the battery cells 120 in a battery module 115, battery pack 110, or other battery or battery unit may be implemented using other battery cell technologies, such as nickel-metal hydride battery cells, lead-acid battery cells, and/or ultracapacitor cells. For example, in a nickel-metal hydride battery cell, the anode 208 may be formed from a hydrogen-absorbing alloy and the cathode 212 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode 208 may be formed at least in part from lithium, the cathode 212 may be formed from at least in part form sulfur, and the electrolyte 210 may be formed from a cyclic ether, a short-chain ether, a glycol ether, an ionic liquid, a super-saturated salt-solvent mixture, a polymer-gelled organic media, a solid polymer, a solid inorganic glass, and/or other suitable electrolyte materials.

In various implementations, the anode 208, the electrolyte 210, and the cathode 212 of FIG. 2C can be packaged into a battery cell housing having any of various shapes, and/or sizes, and/or formed from any of various suitable materials. For example, battery cells 120 can have a cylindrical, rectangular, square, cubic, flat, pouch, elongated, or prismatic outer shape. As depicted in FIG. 2D, for example, a battery cell such as the battery cell 120 may be implemented as a cylindrical cell. In the example of FIG. 2D, the battery cell 120 includes a cell housing 224 having a cylindrical outer shape. For example, the anode 208, the electrolyte 210, and the cathode 212 may be rolled into one or more substantially cylindrical windings 221. As shown, one or more windings 221 of the anode 208, the electrolyte 210, and the cathode 212 (e.g., and/or one or more separator layers such as separator layer 220) may be disposed within the cell housing 224. For example, a separator layer may be disposed between adjacent ones of the windings 221. However, the cylindrical cell implementation of FIG. 2D is merely illustrative, and other implementations of the battery cells 120 are contemplated.

For example, FIG. 2E illustrates an example in which the battery cell 120 is implemented as a prismatic cell. As shown in FIG. 2E, the battery cell 120 may have a cell housing 224 having a right prismatic outer shape. As shown, one or more layers of the anode 208, the cathode 212, and the electrolyte 210 disposed therebetween may be disposed (e.g., with separator materials between the layers) within the cell housing 224 having the right prismatic shape. As examples, multiple layer of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 224 having the right prismatic shape. In the implementation of FIG. 2E, the cell housing 224 has a relatively thick cross-sectional width 217 and is formed from a rigid material. For example, the cell housing 224 in the implementation of FIG. 2E may be formed from a welded, stamped, deep drawn, and/or impact extruded metal sheet, such as a welded, stamped, deep drawn, and/or impact extruded aluminum sheet. For example, the cross-sectional width 217 of the cell housing 224 of FIG. 2E may be as much as, or more than 1 millimeter (mm) to provide a rigid housing for the prismatic battery cell. In one or more implementations, the first terminal 216 and the second terminal 218 in the prismatic cell implementation of FIG. 2E may be formed from a feedthrough conductor that is insulated from the cell housing 224 (e.g., a glass to metal feedthrough) as the conductor passes through to cell housing 224 to expose the first terminal 216 and the second terminal 218 outside the cell housing 224 (e.g., for contact with an interconnect structure 200 of FIG. 2B). However, this implementation of FIG. 2E is also illustrative and yet other implementations of the battery cell 120 are contemplated.

Figure 2F:
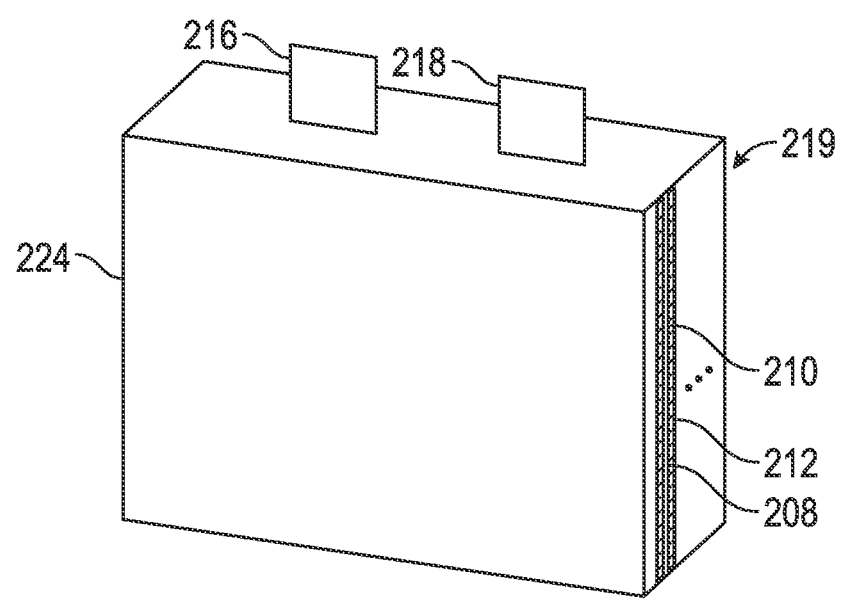
FIG. 2F illustrates a cross-sectional perspective view of a pouch battery cell in accordance with one or more implementations.

For example, FIG. 2F illustrates an example in which the battery cell 120 is implemented as a pouch cell. As shown in FIG. 2F, one or more layers of the anode 208, the cathode 212, and the electrolyte 210 disposed therebetween may be disposed (e.g., with separator materials between the layers) within the cell housing 224 that forms a flexible or malleable pouch housing. In the implementation of FIG. 2F, the cell housing 224 has a relatively thin cross-sectional width 219. For example, the cell housing 224 in the implementation of FIG. 2F may be formed from a flexible or malleable material (e.g., a foil, such as a metal foil, or film, such as an aluminum-coated plastic film). For example, the cross-sectional width 219 of the cell housing 224 of FIG. 2F may be as low as, or less than 0.1 mm, 0.05 mm, 0.02 mm, or 0.01 mm to provide flexible or malleable housing for the pouch battery cell. In one or more implementations, the first terminal 216 and the second terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 224 in these implementations. In the examples of FIGS. 2C, 2E, and 2F, the first terminal 216 and the second terminal 218 are formed on the same side (e.g., a top side) of the battery cell 120. However, this is merely illustrative and, in other implementations, the first terminal 216 and the second terminal 218 may formed on two different sides (e.g., opposing sides, such as a top side and a bottom side) of the battery cell 120. The first terminal 216 and the second terminal 218 may be formed on a same side or difference sides of the cylindrical cell of FIG. 2D in various implementations.

In one or more implementations, a battery module 115, a battery pack 110, a battery unit, or any other battery may include some battery cells 120 that are implemented as solid-state battery cells and other battery cells 120 that are implemented with liquid electrolytes for lithium-ion or other battery cells having liquid electrolytes. One or more of the battery cells 120 may be included a battery module 115 or a battery pack 110, such as to provide an electrical power supply for components of the vehicle 100, the building 180, or any other electrically powered component or device. The cell housing 224 of the battery cell 120 can be disposed in the battery module 115, the battery pack 110, or installed in any of the vehicle 100, the building 180, or any other electrically powered component or device.

Figure 3:
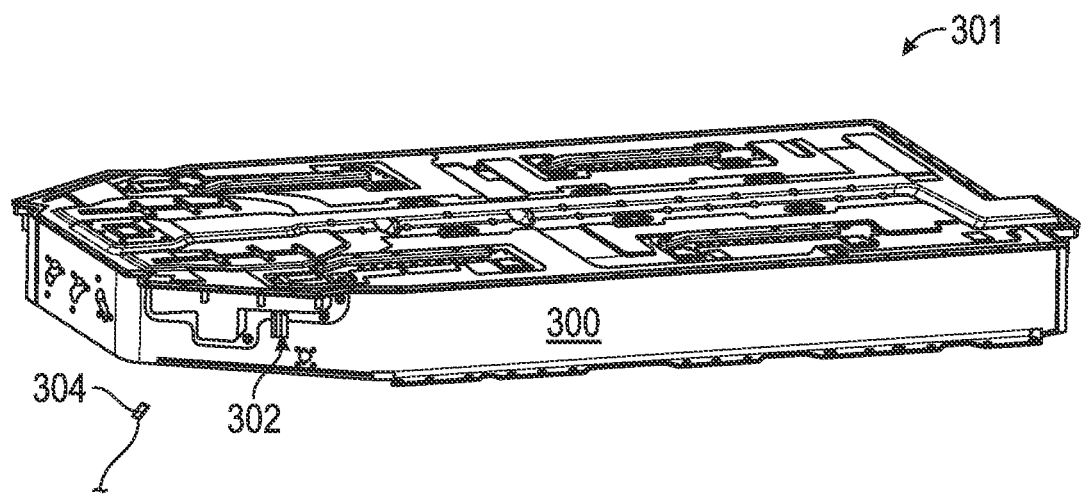
FIG. 3 illustrates a perspective view of an example battery pack having a service port in accordance with one or more implementations.

FIG. 3 illustrates a perspective view of a battery pack 301 (e.g., an implementation of the battery pack 110 described herein) having a battery pack frame 300 (e.g., an implementation of the battery pack frame 205 described herein). As shown in FIG. 3, the battery pack 301 includes a service port 302 (e.g., also referred to herein as an apparatus) on the battery pack frame 300. As discussed in further detail hereinafter, the service port 302 may be an integrated service port that integrates a pressure relief port with an electrical probe port (e.g., an integrated pressure relief and electrical probe port).

Figure 4:
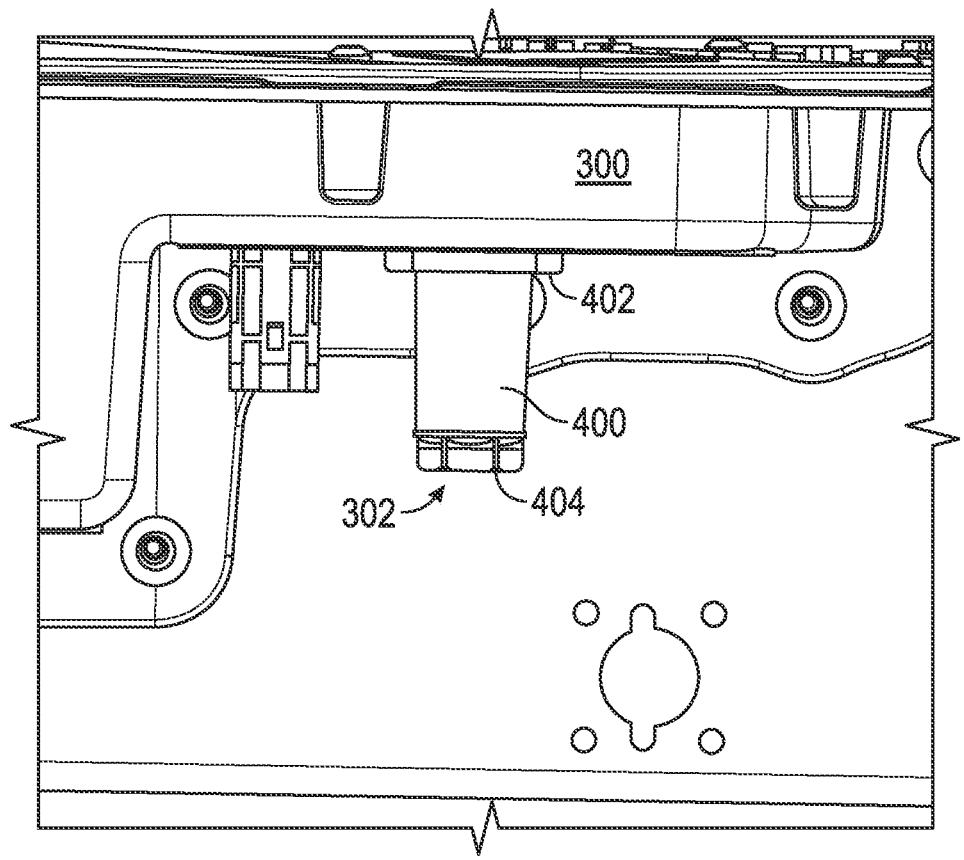
FIG. 4 illustrates a side view of a portion of the battery pack of FIG. 3 in the vicinity of the service port in accordance with one or more implementations.

FIG. 4 illustrates a view of a portion of the battery pack 301 of FIG. 3 in which further details of the service port 302 can be seen. As shown in FIG. 4, the service port 302 may include a housing 400 having a base 402 that is attached to the battery pack frame 300. In one or more implementations, a breather element 404 may be disposed at a distal end (e.g., distal to the battery pack frame 300) of the housing 400. As examples, the breather element 404 may be implemented as a valve structure or a two-way pressure equalization membrane. For example, the breather element may allow airflow therethrough, while preventing dust, particles, or other contaminants from flowing into the housing 400 of the service port 302.

Figure 5A:
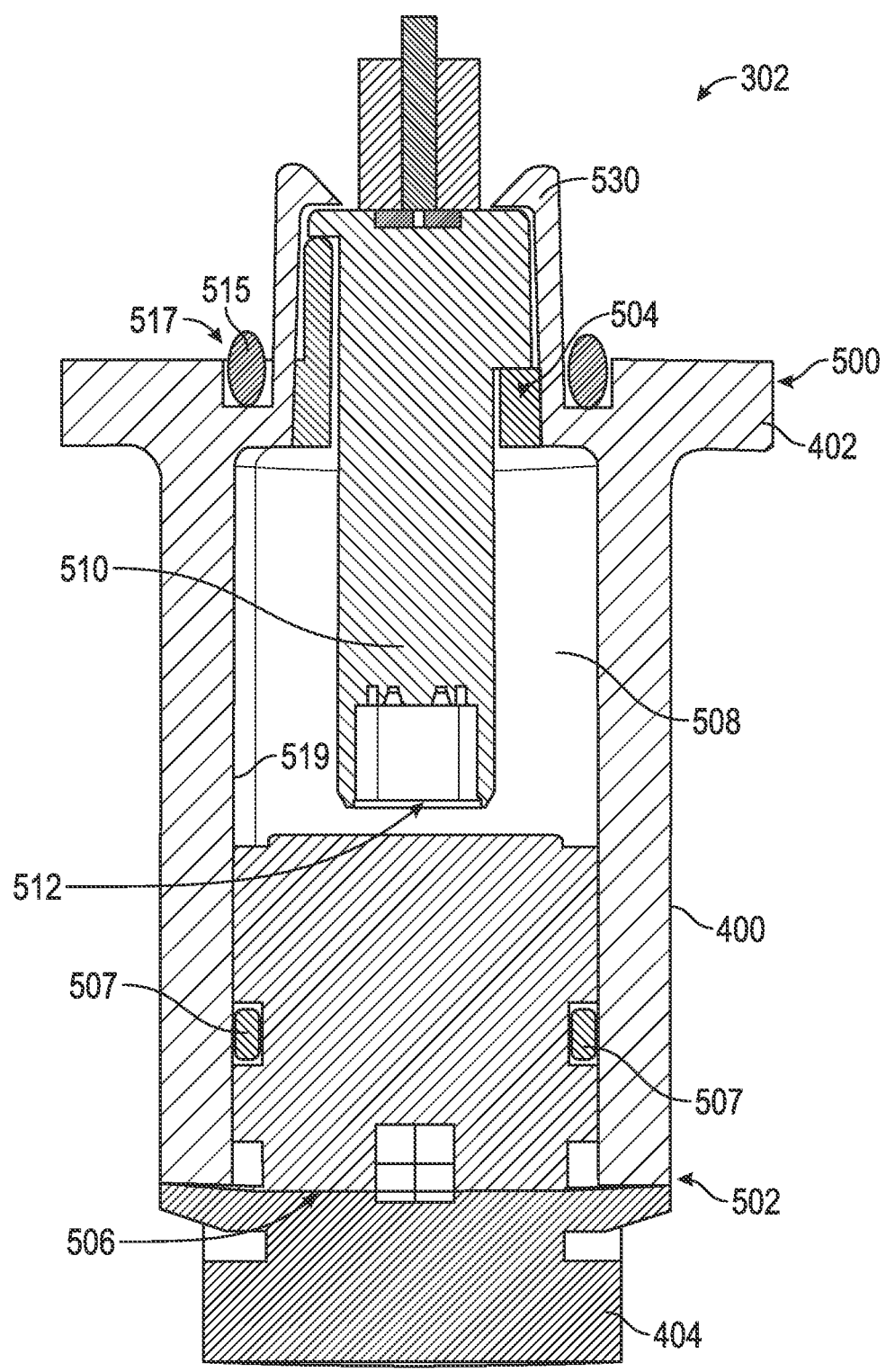
FIG. 5A illustrates a cross-sectional side view of a service port in accordance with one or more implementations.

FIG. 5A illustrates a cross-sectional side view of the service port 302, in accordance with one or more implementations. As shown in FIG. 5A, the housing 400 may have a proximal end 500, configured to be mounted proximal to the battery pack frame 300, and a distal end 502. The housing 400 may also have a proximal opening 504 at the proximal end 500. The housing 400 may also have a distal opening 506 at the distal end 502 of the housing. The housing 400 may also have an open bore 508 or another fluid pathway extending between the distal opening 506 and the proximal opening 504 of the housing 400.

As shown, an electrical header 510 may extend through the proximal opening 504 (e.g., at least partway) into the open bore 508. The electrical header 510 may include one or more (e.g., a pair) of electrical contacts 512 disposed within the open bore 508. In the example of FIG. 5, the breather element 404 is mounted in the distal opening 506. In this example, the breather element 404 is attached to the housing 400, at least in part, by a friction fit between a cylindrical portion of the breather element 404 and a sidewall 519 of the open bore 508. For example, the friction fit may form a radial seal between the open bore 508 and external environment of the housing 400. In the example of FIG. 5, a gasket member 507 is disposed around the cylindrical portion of the breather element 404. The gasket member 507 may help form the radial seal and prevent air from flowing around the breather element 404, such that airflow into and/or out of the open bore 508 flows through the breather element 404, when the breather element 404 is installed. In one or more other implementations, the housing 400 may include a threaded portion on the sidewall 519 within the open bore 508, extending from the distal end 502 toward the proximal end 500, and the breather element 404 may include a threaded portion that is mated to the threaded portion of the housing 400. In one or more implementations in which the breather element 404 includes a threaded portion and screws into the housing 400, the breather element 404 may form a face seal with the distal end 502 of the housing 400.

Figure 5B:
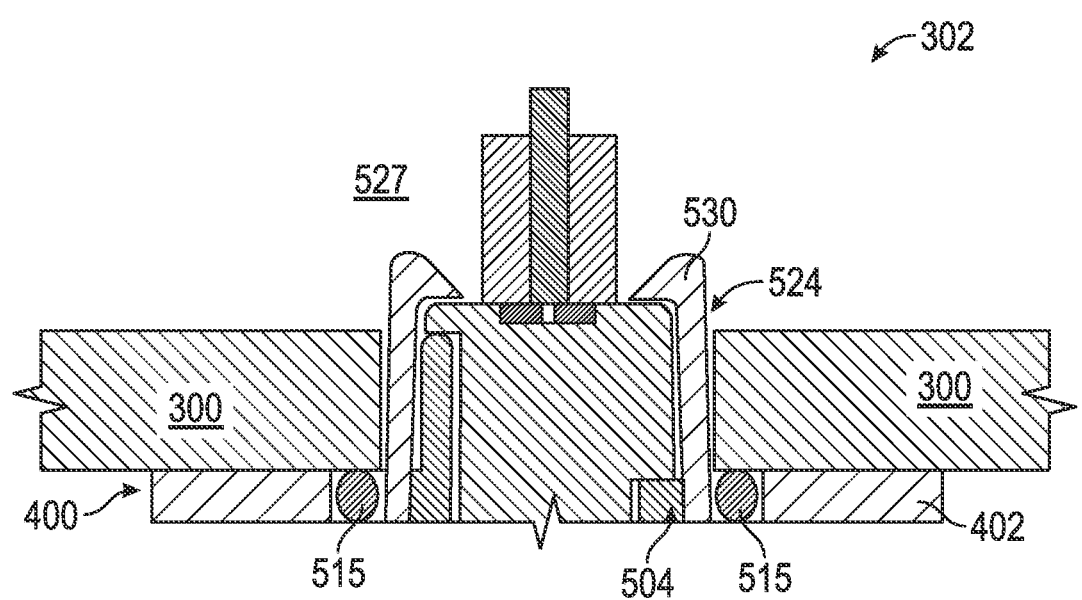
FIG. 5B illustrates a cross-sectional side view of the service port of FIG. 5A attached to the battery pack of FIG. 3 in accordance with one or more implementations.

FIG. 5A also shows how the housing 400 may include a base 402 at the proximal end 500. As shown in FIG. 5B, the base 402 may be configured for attachment to the battery pack frame 300. FIGS. 5A and 5B illustrate how the service port 302 may include a gasket 515 configured to seal an interface between the base 402 of the housing 400 and the battery pack frame 300. As shown in FIG. 5A, the gasket 515 may be disposed in a recess 517 in the base 402 of the housing 400. As shown in FIG. 5B, when the housing 400 is attached to the battery pack frame 300 (e.g., using one or more screws, bolts, or other attachment members), the gasket 515 may be compressed between the housing 400 and the battery pack frame 300 to sealingly attach the housing 400 to the battery pack frame 300. As shown in FIGS. 5A and 5B, the housing 400 may include one or more retention fingers 530 (and/or other retention members) that hold (retain) the electrical header 510 within the proximal opening 504. For example, to assemble to the service port 302, the housing 400 may be attached to the battery pack frame 300, the electrical header 510 may be inserted (e.g., from within an interior chamber, such as the volume 527 of FIG. 5B, within the battery pack frame 300) through an opening 524 in the battery pack frame 300, through the proximal opening 504 at least partially into the open bore 508 of the housing 400 (e.g., until the retention fingers 530 snap into place to retain the electrical header 510 within the proximal opening 504), and the breather element 404 may be inserted into the distal opening 506.

Figure 6:
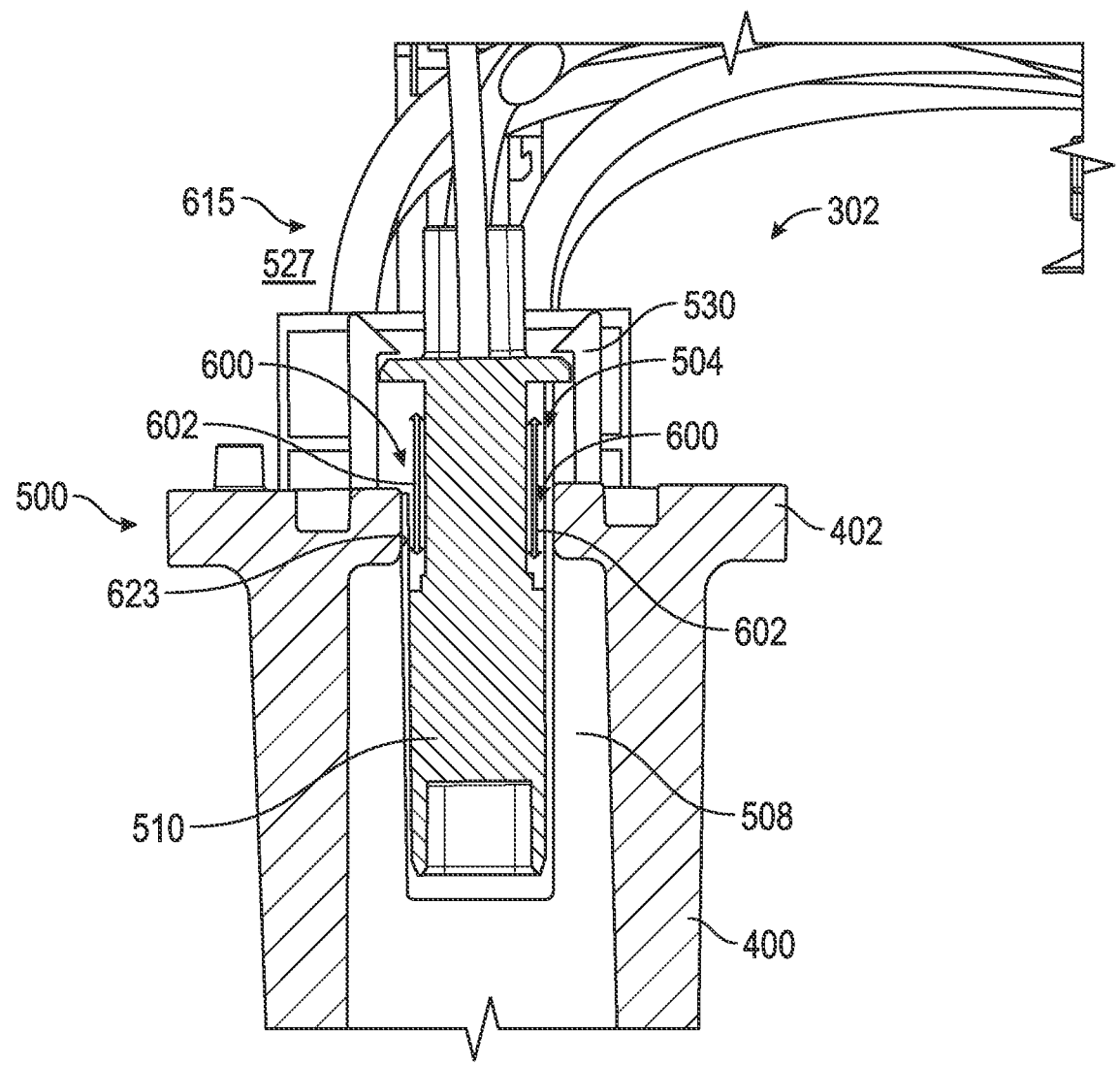
FIG. 6 illustrates a cross-sectional side view of a portion of the service port of FIG. 5, in the vicinity of an airflow pathway in accordance with one or more implementations.

As shown in FIG. 6, the service port 302 may include a gap 600 between a sidewall 623 of the proximal opening 504 and a portion of the electrical header 510 that is disposed within the proximal opening 504. In the example of FIG. 6, the battery pack frame 300 is omitted for clarity. As shown, the gap 600 forms an airflow pathway 602 between the open bore 508 and a volume outside the housing 400 (e.g., an interior chamber, such as the volume 527 within the battery pack frame 300). In this way, when the base 402 of the housing 400 is sealingly attached to the battery pack frame 300, air can still flow (between the volume 527 within the battery pack frame 300 and the external environment outside the housing 400 and the battery pack frame 300) via the airflow pathways 602, the open bore 508, and/or the breather element 404. In one or more implementations, the gap 600, the open bore 508, and the breather element 404 form a pressure equalization port. As illustrated by FIGS. 5A, 5B, and 6, the pressure equalization port may be integrated with an electrical probe port formed by the electrical header 510 (including the electrical contacts 512) and the open bore 508 of the housing 400.

As shown in FIG. 6, the electrical header 510 may be electrically coupled to a high voltage harness 615. The high voltage harness 615 may extend into and within battery pack frame 300 (e.g., within the volume 527) and may be coupled to one or more high voltage sources and/or connectors within the battery pack frame 300. For example, the high voltage harness 615 may provide a voltage to the electrical header 510 when that voltage or another voltage is also provided to one or more other external connectors of the battery pack 301 (e.g., connectors for the vehicle 100, the building 180, the cable/connector 106, the cable/connector 174, and/or other external connectors), such as to indicate that the voltage or other voltage is also being provided to one or more other external connectors of the battery pack 301.

Figure 7:
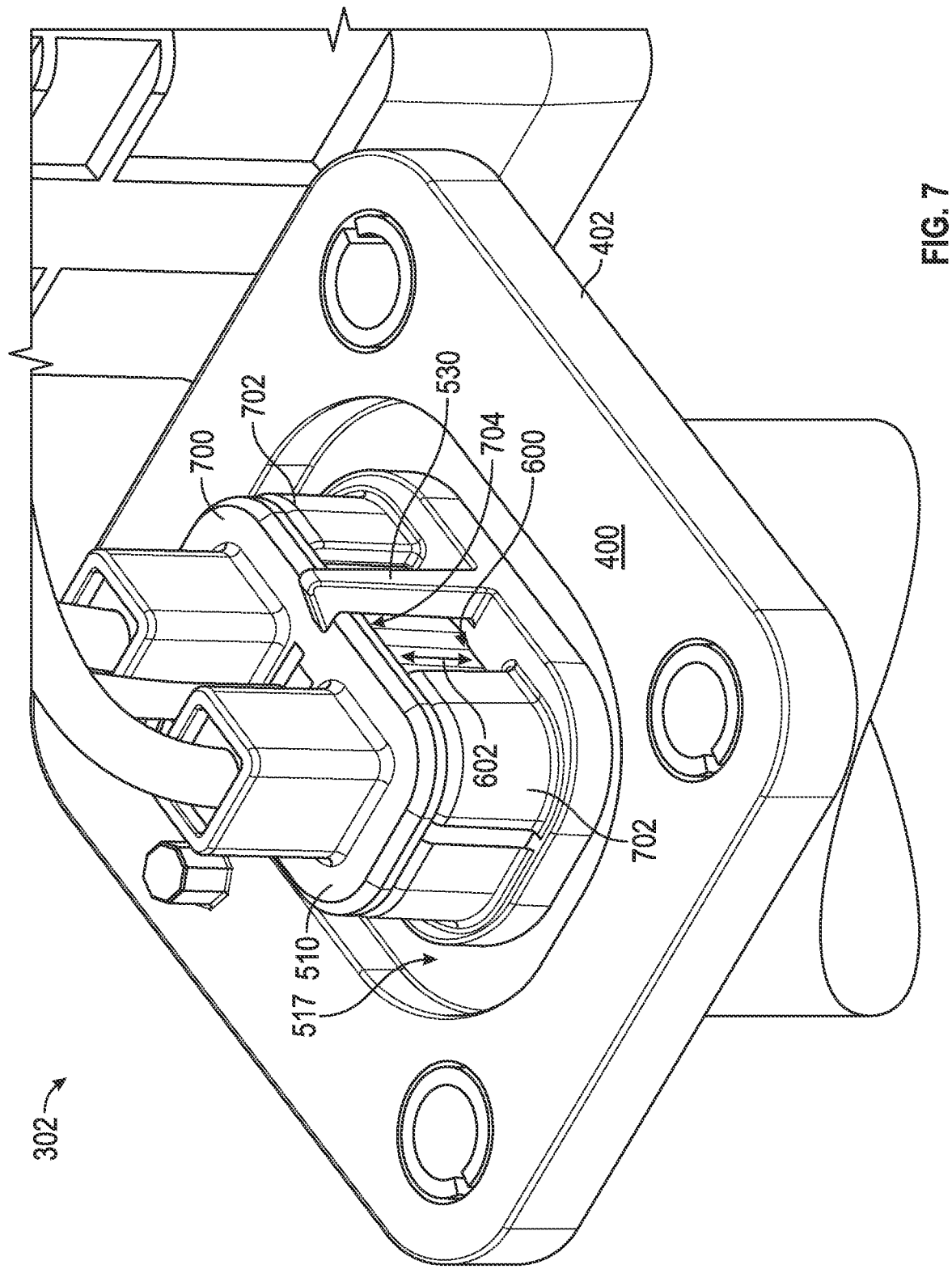
FIG. 7 illustrates a rear perspective view of a portion of a service port in accordance with one or more implementations.

FIG. 7 illustrates a bottom perspective view of the service port 302, in accordance with one or more implementations. In the example of FIG. 7, the electrical header 510 (e.g., including a header housing 700 of the electrical header 510) is retained within the proximal opening 504 of the housing 400 by retention fingers 530. For example, a ledge 704 of the header housing 700 may be pressed against a set of support structures 702 of the housing 400 by a retaining force provided by the retention fingers 530. In the example of FIG. 7, the gap 600 on one side of the electrical header 510 can be seen. As shown, the gap 600 may be formed under the ledge 704 of the header housing 700, and the gap 600, along with a space between the support structures 702 may form the airflow pathway 602 on that side of the electrical header 510 (e.g., air can flow through the gap 600, through the space between the support structures 702, and around the retention fingers 530). FIG. 7 also shows how the recess 517 for the gasket 515 (omitted in FIG. 7 for clarity) may extend around the proximal opening 504 and the electrical header 510. As illustrated in FIGS. 5A, 5B, 6 and 7, header housing 700 of the electrical header 510 may be mounted with some portions thereof in contact with some portions of the sidewall 519 of the proximal opening 504, and with other portions thereof separated from the sidewall 519 by the gap 600 that forms (at least part of) the airflow pathway 602.

Figure 8:
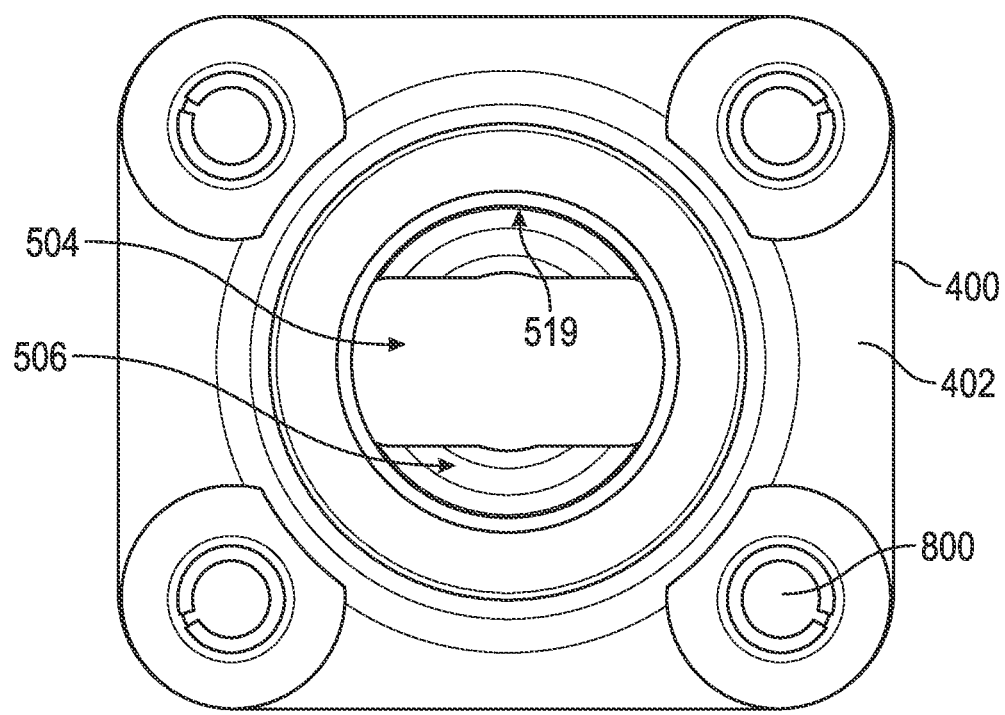
FIG. 8 illustrates a top view of a housing of a service port in accordance with one or more implementations.

FIG. 8 illustrates a top view of the housing 400 with the electrical header 510 and the breather element 404 omitted (e.g., prior to insertion of the electrical header 510 through the proximal opening 504 and the breather element 404 into the distal opening 506). In the example of FIG. 8, the proximal opening 504 can be seen through the distal opening 506. As shown in FIG. 8, in one or more implementations, the distal opening 506 may be a substantially rounded or circular opening, and the proximal opening 504 may be a rectilinear opening. FIG. 8 also shows an example of attachment features 800 that may be provided on the housing 400 (e.g., on the base 402 of the housing 400). For example, attachment features 800 may be holes for receiving a bolt, a screw, or another attachment member for attaching the housing 400 to an electrical power supply such as the battery pack 301 (e.g., an implementation of the battery pack 110) described herein. FIG. 8 also indicates the sidewall 519 which may be provided with or without threads for receiving the breather element 404.

Figure 9:
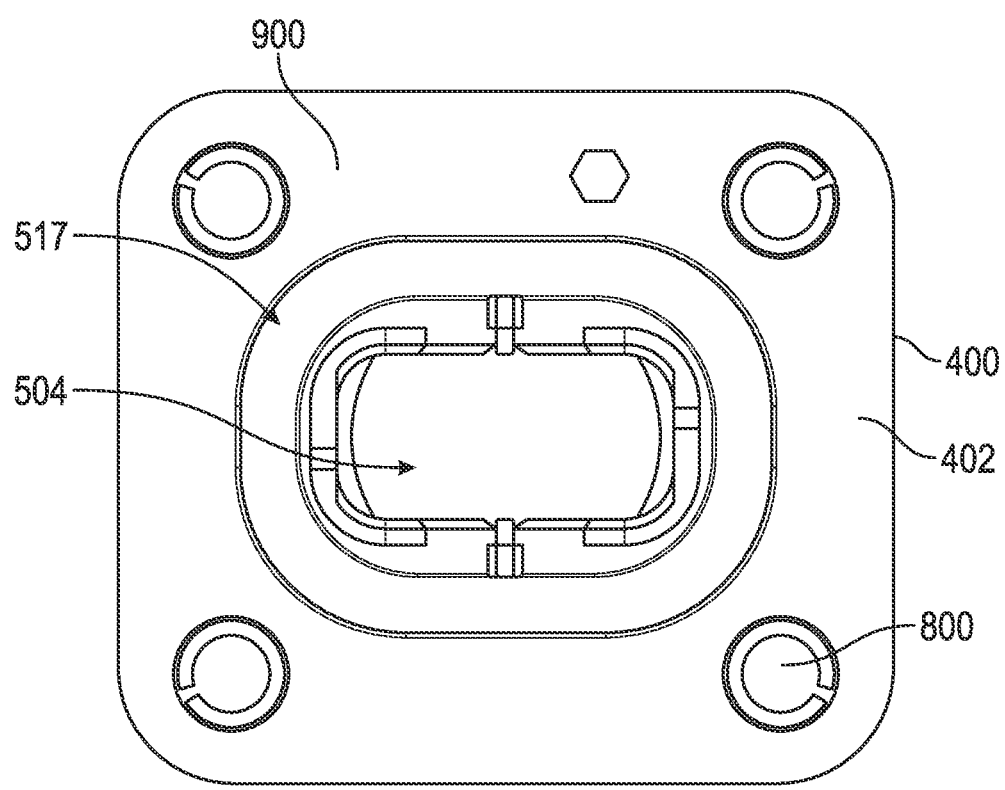
FIG. 9 illustrates a bottom view of a housing of a service port in accordance with one or more implementations.

FIG. 9 illustrates a bottom view of the housing 400 of the service port 302 with the electrical header 510 and the breather element 404 omitted (e.g., prior to insertion of the electrical header 510 through the proximal opening 504 and the breather element 404 into the distal opening 506). In the example of FIG. 9, an attachment surface 900 on the housing 400 is visible, the attachment surface 900 configured to be mounted in contact with an external surface of an electrical power supply such as the battery pack 301 (e.g., an implementation of the battery pack 110) described herein.

Figure 10:
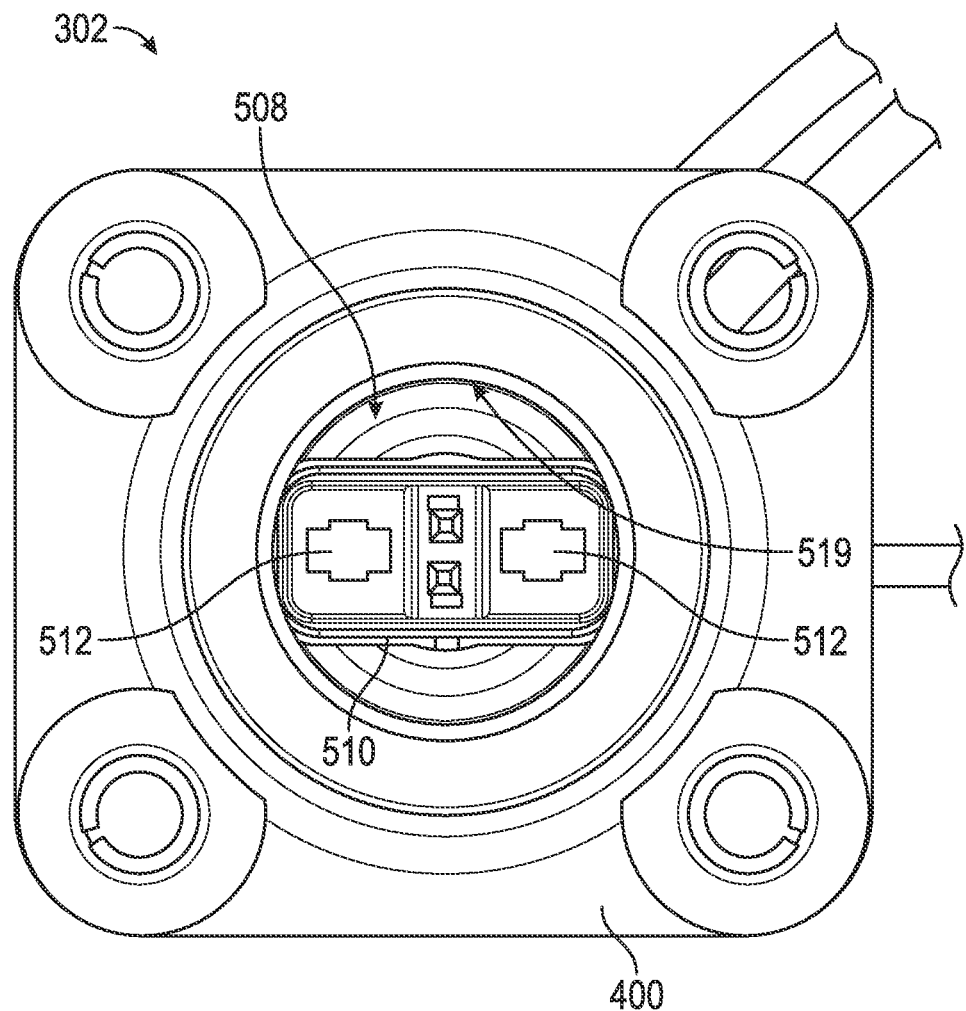
FIG. 10 illustrates a top view of a housing of a service port with an installed electrical header in accordance with one or more implementations.

FIG. 10 illustrates a top view of the service port 302 with the electrical header 510 mounted in the housing 400. In the example of FIG. 10, the breather element 404 is omitted (e.g., the service port 302 is shown prior to insertion of the breather element 404 into the distal opening 506, or after removal of the breather element 404 from the distal opening 506 such as by a service technician for gaining access to the electrical header 510). In the example of FIG. 10, the electrical contacts 512 are visible. During a servicing operation, a service technician may insert an electrical connector (e.g., the electrical connector 304 of FIG. 3) into the open bore 508 of the housing 400 until the electrical connector engages with the electrical header 510, with electrical contacts on the electrical connector in contact with the electrical contacts 512 on the electrical header. In this way, the service technician can probe the voltage on the high voltage harness 615 to determine whether the battery pack 301 (or another electrical power supply implementing the service port 302) is ready for disconnection from one or more devices (e.g., the vehicle 100 or the building 180).

As illustrated in the examples of FIGS. 3-10, in one or more implementations, an apparatus, such as an electrical power supply, such as a battery pack 301 (e.g., an implementation of the battery pack 110) may be provided that includes a pack frame (e.g., battery pack frame 300) having an interior chamber (e.g., volume 527) configured for storing one or more battery cells (e.g., battery cells 120, directly provided in the interior chamber or provided within one or more battery modules 115). The battery pack 301 (or other electrical power supply) may also include a high voltage harness 615, and a pressure equalization port (e.g., service port 302) on the pack frame. In one or more implementations, the pressure equalization port includes an electrical header 510 within the pressure equalization port and electrically coupled to the high voltage harness 615. The pressure equalization port (e.g., service port 302 may include at least the housing 400 and the electrical header 510 as described herein, and, optionally, a breather element 404 that may be configured to equalize an interior pressure within the interior chamber with an external pressure in an environment outside the pack frame. For example, in one or more implementations, the pressure equalization port may include a housing (e.g., housing 400) having an open bore (e.g., open bore 508) extending between a distal opening (e.g., distal opening 506) and a proximal opening (e.g., proximal opening 504) of the housing; an electrical header (e.g., electrical header 510) that is electrically coupled to the high voltage harness (e.g., high voltage harness 615), that extends through the proximal opening into the open bore, and that includes one or more electrical contacts (e.g., electrical contact(s) 512) disposed within the open bore; and a breather element (e.g., breather element 404) mounted in the distal opening.

In one or more implementations, the pressure equalization port may include the housing 400 having the proximal end 500 coupled to the pack frame, and the distal end 502. The housing may include the proximal opening 504, the distal opening 506 at the distal end of the housing (e.g., distal with respect to the pack frame), and the open bore 508 extending between the distal opening 506 and the proximal opening 504. The open bore 508 may be fluidly coupled to the interior chamber within the pack frame. In one or more implementations, the battery pack 301 (or other electrical power supply implementing the service port 302) may also include an opening 524 in the pack frame that is aligned with the proximal opening 504. The electrical header 510 may include a portion that extends through the opening 524, and through the proximal opening 504 (e.g., and the opening 524 in the pack frame) into the open bore 508. The electrical header may be connected to the high voltage harness 615 within the volume 527 (interior chamber) via the opening 524 in the pack frame.

Figure 11:
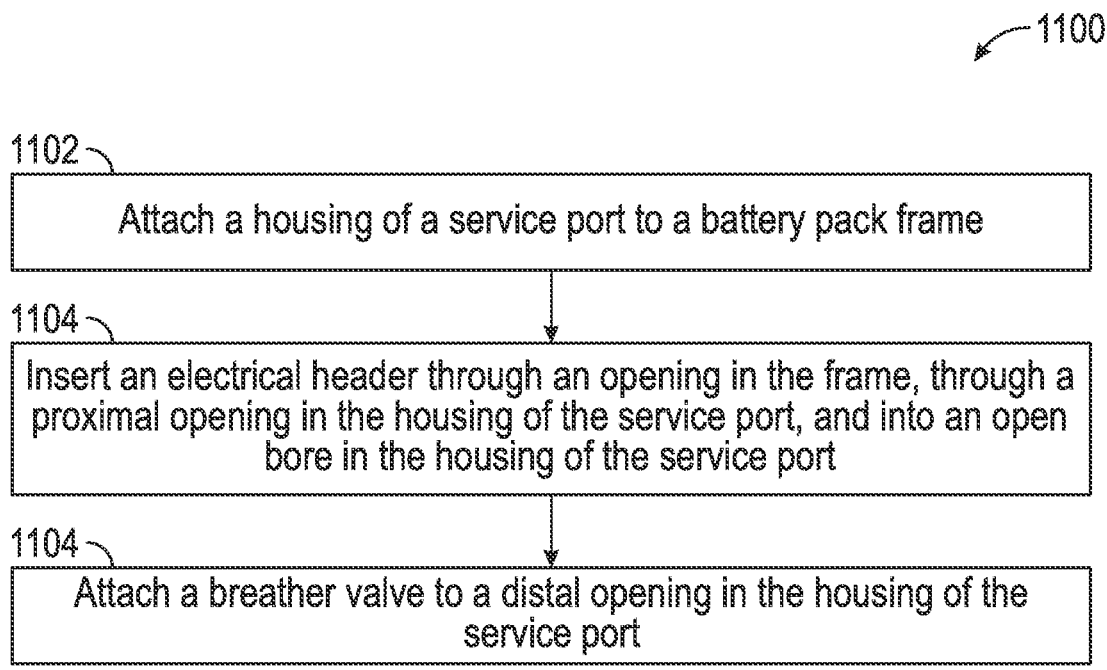
FIG. 11 illustrates a flow chart of example operations that may be performed for assembling a service port in accordance with implementations of the subject technology.

FIG. 11 illustrates a flow diagram of an example process 1100 that may be performed for assembling a service port, in accordance with implementations of the subject technology. For explanatory purposes, the process 1100 is primarily described herein with reference to the service port 302 and the battery pack 301 of FIG. 3. However, the process 1100 is not limited to the service port 302 and the battery pack 301 of FIG. 3, and one or more blocks (or operations) of the process 1100 may be performed by one or more other structural components of other suitable moveable apparatuses, devices, or systems. Further for explanatory purposes, some of the blocks of the process 1100 are described herein as occurring in serial, or linearly. However, multiple blocks of the process 1100 may occur in parallel. In addition, the blocks of the process 1100 need not be performed in the order shown and/or one or more blocks of the process 1100 need not be performed and/or can be replaced by other operations.

As illustrated in FIG. 11, at block 1102, a housing (e.g., housing 400) of a service port (e.g., service port 302) may be attached to a battery pack frame (e.g., battery pack frame 300 or battery pack frame 205). For example, the housing may be attached to the battery pack frame using one or more screws, bolts, or other fastening members (e.g., via attachment features 800 in a base 402 of the housing 400). In one or more implementations, attaching the housing to the battery pack frame may include compressing a gasket (e.g., gasket 515) between a portion of the housing and a portion of the battery pack frame to sealingly attach the housing to the battery pack frame (e.g., as illustrated in FIG. 6B).

At block 1104, an electrical header (e.g., electrical header 510) may be inserted through an opening (e.g., proximal opening 504) in the battery pack frame, through a proximal opening (e.g., proximal opening 504) in the housing of the service port, and into an open bore (e.g., open bore 508) in the housing of the service port. The electrical header may be secured in the proximal opening by one or more retention fingers (e.g., retention fingers 530) on the housing of the service port (e.g., as illustrated in FIGS. 5A, 5B, 6, and 7). The electrical header may be inserted, for example, until a ledge 704 of a header housing 700 of the electrical header contacts one or more support structures 702 on the housing 400 of the service port 302, and the retention fingers 530 snap into place to hold the ledge 704 against the support structures 702.

At block 1106, a breather valve (e.g., breather element 404) may be inserted to a distal opening (e.g., distal opening 506) in the housing of the service port. In one or more implementations, inserting the breather valve may include securing the breather valve in the open bore by a friction fit. In one or more other implementations, inserting the breather valve may include screwing the breather valve into a threaded portion of the open bore.

Figure 12:
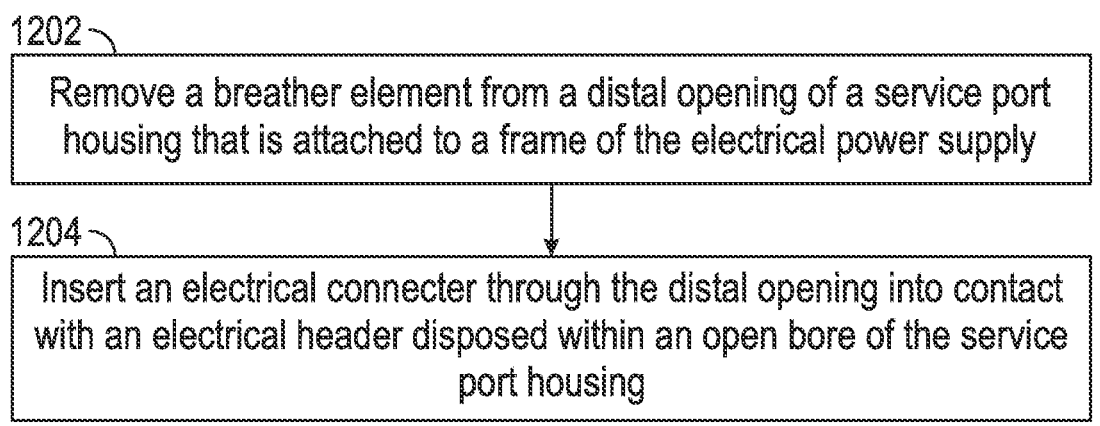
FIG. 12 illustrates a flow chart of example operations that may be performed for servicing an electrical power supply in accordance with implementations of the subject technology.

FIG. 12 illustrates a flow diagram of an example process 1200 that may be performed for servicing an electrical power supply, in accordance with implementations of the subject technology. For explanatory purposes, the process 1200 is primarily described herein with reference to the service port 302 and the battery pack 301 of FIG. 3. However, the process 1200 is not limited to the service port 302 and the battery pack 301 of FIG. 3, and one or more blocks (or operations) of the process 1200 may be performed by one or more other structural components of other suitable moveable apparatuses, devices, or systems. Further for explanatory purposes, some of the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

As illustrated in FIG. 12, at block 1202, a breather element (e.g., breather element 404) may be removed from a distal opening (e.g., distal opening 506) of a service port housing (e.g., housing 400) that is attached to a frame (e.g., battery pack frame 300 or battery pack frame 205) of an electrical power supply (e.g., battery pack 301). For example, the service port housing may be a housing of service port 302, such as an integrated service port (e.g., an integrated electrical probe and breather port).

At block 1204, an electrical connecter (e.g., electrical connector 304) may be inserted through the distal opening into contact with an electrical header (e.g., electrical header 510) disposed within the service port housing (e.g., within an open bore, such as open bore 508, of the service port housing). For example, the electrical connector may have one or more electrical contacts, and inserting the electrical connector may include inserting the electrical connector into the open bore 508 into engagement with the electrical header 510, such that the electrical contacts on the electrical connector are in contact with electrical contacts 512 on the electrical header 510.

In one or more implementations, the process 1200 may also include determining, based on the contact between the electrical connecter and the electrical header, that one or more contactors within the electrical power supply are open (e.g., by measuring a voltage on one or more of the electrical contacts 512 of the electrical header 510); and disconnecting a device (e.g., the vehicle 100 or the cable/connector 174) from the electrical power supply based on the determining (e.g., based on determining, based on the voltage on one or more of the electrical contacts 512 of the electrical header 510, that electrical contactors within the electrical power supply are open and that the device is not pulling current from the electrical power supply).

Aspects of the subject technology can help improve the serviceability of electrical power supplies, such as batteries and/or battery packs. This can help facilitate the functioning of and/or proliferation of electric vehicles, which can positively impact the climate by reducing greenhouse gas emissions.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus, comprising:
   a housing comprising a distal opening and a proximal opening;
   an electrical header that extends through the proximal opening and includes one or more electrical contacts disposed within the housing; and
   a breather element mounted in the distal opening.

2. The apparatus of claim 1, wherein the breather element comprises a two-way pressure equalization membrane.

3. The apparatus of claim 1, wherein the breather element is attached to the housing, at least in part, by a friction fit between a cylindrical portion of the breather element and a sidewall of an open bore of the housing, wherein the friction fit forms a radial seal between the open bore and an external environment.

4. The apparatus of claim 1, wherein the housing comprises an open bore that extends between the distal opening and the proximal opening, the housing including a threaded portion within the open bore extending from a distal end of the housing toward a proximal end of the housing, and wherein the breather element comprises a threaded portion that is mated to the threaded portion of the housing.

5. The apparatus of claim 1, further comprising a gap between a sidewall of the proximal opening and a portion of the electrical header that is disposed within the proximal opening.

6. The apparatus of claim 5, wherein the gap, the housing, and the breather element form a pressure equalization port.

7. The apparatus of claim 5, wherein the gap forms an airflow pathway between an open bore of the housing and a volume outside the housing.

8. The apparatus of claim 1, wherein the housing further comprises one or more retention fingers that hold the electrical header within the proximal opening.

9. The apparatus of claim 1, further comprising:
  a base at a proximal end of the housing and configured for attachment to a battery pack frame; and
  a gasket configured to seal an interface between the base of the housing and the battery pack frame.

10. The apparatus of claim 1, wherein the electrical header is electrically coupled to a high voltage harness within a battery pack frame.

11. The apparatus of claim 1, wherein the apparatus is attached to a battery pack frame.

12. The apparatus of claim 11, wherein the battery pack frame is disposed in an electric vehicle.

13. The apparatus of claim 11, wherein the battery pack frame is integrated into an energy storage system for a building.

14. A battery pack, comprising:
  a pack frame having an interior chamber configured for storing one or more battery cells;
  a high voltage harness; and
  a pressure equalization port on the pack frame that includes:
    a housing having a distal opening and a proximal opening;
    an electrical header that is electrically coupled to the high voltage harness, that extends through the proximal opening, and that includes one or more electrical contacts disposed within an open bore of the housing; and
    a breather element mounted in the distal opening.

15. The battery pack of claim 14, wherein the pressure equalization port is configured to equalize an interior pressure within the interior chamber with an external pressure in an environment outside the pack frame.

16. The battery pack of claim 14, wherein the housing of the pressure equalization port comprises the open bore extending between the distal opening and the proximal opening, the open bore fluidly coupled to the interior chamber within the pack frame.

17. The battery pack of claim 16, further comprising:
  an opening in the pack frame that is aligned with the proximal opening, wherein the electrical header comprises a portion that extends through the opening in the pack frame, and through proximal opening into the open bore.

18. The battery pack of claim 17, wherein the electrical header is connected to the high voltage harness within the interior chamber via the opening in the pack frame.

19. A method of servicing an electrical power supply, the method comprising:
  removing a breather element from a distal opening of a service port housing that is attached to a frame of the electrical power supply; and
  inserting an electrical connecter through the distal opening into contact with an electrical header disposed within the service port housing.

20. The method of claim 19, further comprising:
  determining, based on the contact between the electrical connecter and the electrical header, that one or more contactors within the electrical power supply are open; and
  disconnecting a device from the electrical power supply based on the determining.

* * * * *